United States Patent

[11] 3,572,982

| [72] | Inventor | Friedrich Kozdon |
| | | Erlangen-Buckenhof, Germany |
| [21] | Appl. No. | 801,326 |
| [22] | Filed | Feb. 24, 1969 |
| [45] | Patented | Mar. 30, 1971 |
| [73] | Assignee | Siemens Aktiengesellschaft |
| | | Berlin and Munich, Germany |
| [32] | Priority | Mar. 2, 1968 |
| [33] | | Germany |
| [31] | | P 16 38 272.2 |

[54] PUMP WITH GAP-TUBE MOTOR
5 Claims, 4 Drawing Figs.

[52] U.S. Cl. .................................................. 417/423,
310/86, 310/156, 318/254
[51] Int. Cl. ............................................... F04d 13/02,
H02k 5/10, H02p 5/20
[50] Field of Search .......................................... 103/87;
310/86, 87, 156; 318/254; 417/423

[56] References Cited
UNITED STATES PATENTS

| 3,119,342 | 1/1964 | White | 310/86 |
| 3,174,088 | 3/1965 | Muller | 318/254 |
| 3,305,717 | 2/1967 | Weiss | 318/254 |
| 3,333,544 | 8/1967 | Turk | 310/86 |
| 3,334,252 | 8/1967 | Gayral | 310/86 |
| 3,383,574 | 5/1968 | Manteuffel | 318/254 |
| 3,483,456 | 12/1969 | Brunner et al. | 318/254 |

*Primary Examiner*—Henry F. Raduazo
*Attorneys*—Curt M. Avery, Arthur E. Wilfond, Herbert L. Lerner and Daniel J. Tick ABSTRACT: A brushless DC motor having permanent magnets is coaxially joined with a pump rotor within a tubular housing portion of nonmagnetic material. The rotor and the bearings thereof are exposed to the liquid being pumped. The motor has field windings mounted externally on the tubular portion for action upon the permanent magnets. Sensors responsive to the angular position of the permanent magnets control the commutation of the field windings and are mounted on the pump housing externally of the tubular portion.

Patented March 30, 1971　　　　　　　　　　　　　　　3,572,982

PUMP WITH GAP-TUBE MOTOR

Description of the Invention

The present invention relates to a pump for pumping toxic or aggressive liquids such as, for example, electrolytes in electrochemical cells. More particularly, the invention relates to a pump with a gap-tube motor which is operated by DC.

Due to the toxicity or aggressiveness of the liquid to be pumped, the electrolyte-conveying pump must meet exacting demands of reliability. Thus, for example, the pump must be hermetically sealed against the outside atmosphere and must be capable of operation without maintenance for long periods of time. There should be no need for special lubricants, since this would contaminate or enter into a chemical reaction with the electrolyte. This may result in a considerable reduction of the energy capacity and the useful life of the fuel cells. Furthermore, the direct current produced by the electrochemical cells should be utilizable directly for operating the pump.

In order to satisfy the aforedescribed requirements, it has been suggested that magnetic couplings be utilized. For this purpose, an annular permanent magnet is seated on the rotor and rotates in the medium to be pumped or conveyed. The annular magnet is enclosed and sealed within the pump housing. The field of the magnet extends externally through the nonmagnetic pump housing and reaches an annular outer coupling member which is affixed to the shaft of the drive motor.

Gap-tube motor pumps are also known for alternating or three-phase current. The rotor of the motor supports the armature with a short circuit winding. The rotor and its armature rotate in the medium to be pumped or coupled and must be especially protected against corrosion by said medium.

The principal disadvantages of magnetic coupling are the large size and great weight of the equipment. Gap-tube motors for AC operation require additional corrosion protection for the rotor bearing the armature winding and comprising sheet metal laminated stacks. The gap-tube motors may be operated by direct current only if a suitable current converter is utilized. Furthermore, operation with a blocked armature or a high overload may produce undesirable heating of the liquid to be pumped, due to short circuit currents induced in the rotor.

The principal object of the present invention is to provide a new and improved gap-tube motor pump.

An object of the present invention is to provide a new and improved gap-tube motor pump.

An object of the present invention is to provide a gap-tube motor pump which overcomes the disadvantages of gap-tube motor pumps of known type and of magnetic couplings of known type.

An object of the present invention is to provide a gap-tube motor pump which functions efficiently, effectively and reliably without maintenance for long periods of time.

An object of the present invention is to provide a gap-tube motor pump which maintains the medium to be pumped separately sealed from the motor.

An object of the present invention is to provide a gap-tube motor pump which is considerably easier to construct and considerably reduced in size and weight relative to known pumps driven by DC motors.

An object of the present invention is to provide a gap-tube motor pump which eliminates the motor rotor, the motor bearings required for its journaling and external magnetic coupling.

An object of the present invention is to provide a gap-tube motor pump which is highly suitable for pumping or conveying liquids sensitive to overheating.

An object of the present invention is to provide a gap-tube motor pump wherein short circuit currents are not induced in the rotor.

An object of the present invention is to provide a gap-tube motor pump of which the number of rotations or revolutions is readily adjustable and controllable, as in a conventional DC motor.

An object of the present invention is to provide a gap-tube motor pump of which the pump bearings are lubricated by the liquid to be pumped, so that the pump operates satisfactorily, without maintenance, for long periods of time, and contamination of such liquid by said lubricants is thus avoided, thereby eliminating the possibility of a disturbed electrochemical reaction of the electrochemical cells.

An object of the present invention is to provide a gap-tube motor pump which is highly suitable for pumping liquids which must be prevented from escaping from the pump housing at any cost such as, for example, radioactive, toxic, infected, aggressive, or otherwise undesirable or dangerous liquids and those which react violently in contact with the atmosphere.

Another object of the present invention is to provide a gap-tube motor pump which is especially suitable as a fuel pump on vehicles such as automobiles, boats or aircraft.

Still another object of the present invention is to provide a gap-tube motor pump of particularly simple structure, but reliable operation, which is especially adapted for use as a fuel pump for automotive vehicles.

In accordance with the present invention, a pump for chemically aggressive liquids comprises a pump housing having a tubular portion of nonmagnetic material. A pump rotor is coaxially journaled in the housing and has bearings enclosed within the housing so that the rotor and the bearings are exposed to the liquid being pumped. A brushless DC motor having permanent magnet means is coaxially joined with the pump rotor within the tubular housing portion and has field windings mounted externally on the tubular portion for action upon the permanent magnet means. Sensors responsive to the angular position of the permanent magnet means control the commutation of the field windings. The sensors are mounted on the pump housing externally of the tubular portion.

The pump housing has an inlet duct and an outlet duct for ingress and egress of the liquid and is otherwise completely sealed so as to hermetically seal the pump rotor with the magnet and the bearings. The angular position sensors comprise galvanomagnetic members such as field plates or two-terminal resistors, or Hall generators.

In accordance with the present invention, a fuel pump for vehicles comprises a pump housing having a tubular portion of nonmagnetic material. A vane-carrying pump rotor is coaxially journaled in the housing and has bearings enclosed within the housing so that the rotor and the bearings are exposed to liquid being pumped. A brushless DC motor having permanent magnet means is coaxially joined with the pump rotor within the tubular housing portion. The motor has field windings mounted externally on the tubular portion for action upon the permanent magnet means. The housing has an inlet duct and an outlet duct for ingress and egress of the liquid and is otherwise sealed so as to hermetically envelop the pump rotor with the magnet and the bearings. Galvanomagnetic sensors responsive to angular position of the permanent magnet means controls the commutation of the field windings. The sensors are mounted on the pump housing externally of the tubular portion.

It is thus seen that the gap-tube motor pump of the present invention, for pumping aggressive liquids and a medium which must be hermetically sealed from the outside atmosphere such as, for example, electrolytes in electrochemical cells, utilizes a brushless DC motor. A permanent magnet is affixed to the pump rotor and the magnet and rotor are sealed from the outside atmosphere by a gap-tube. The pump rotor simultaneously functions as the motor rotor and the motor windings and semiconductor components are positioned outside the gap-tube.

In order that the present invention may be readily carried into effect, it will now be described with reference to the accompanying drawings, wherein.

In the FIGS., the same components are identified by the same reference numerals.

Figure 2:
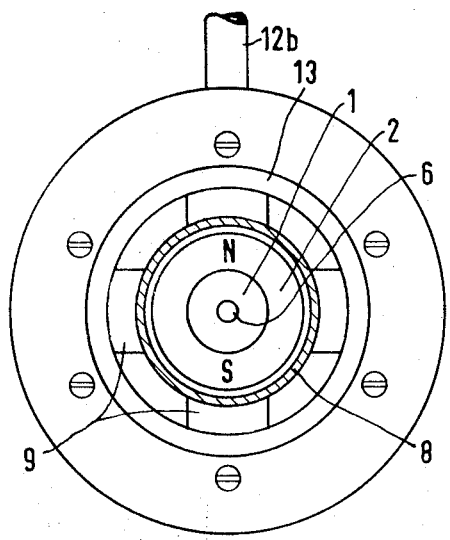
FIG. 2 is an axial view, partly in section, of the gap-tube motor pump of the present invention.
Figure 1:
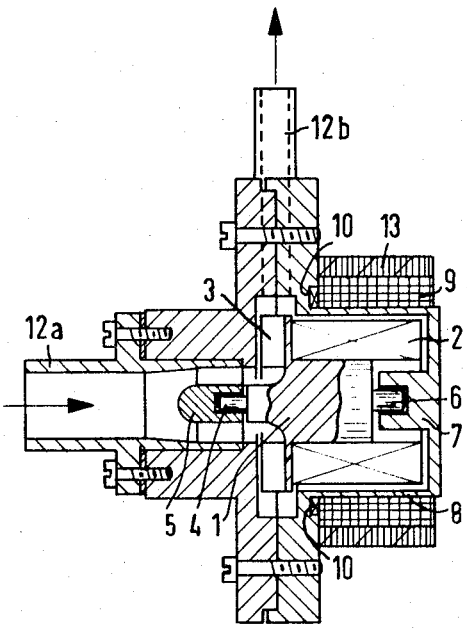
FIG. 1 is a sectional view of an embodiment of the gap-tube motor pump of the present invention.

In FIGS. 1 and 2, a pump rotor 1 has a permanent magnet 2 of substantially annular or cylindrical configuration affixed thereto. Also affixed to the pump rotor 1 is an impeller 3. The pump rotor 1 has a bearing pin 4 which is journaled in a bearing 5, and a bearing pin 6 which is journaled in a bearing 7. The bearings 5 and 7 and the corresponding bearing pins 4 and 6 are positioned in and lubricated by the medium of the liquids to be pumped. The pump rotor 1 is thus mounted for rotation about its axis.

A stationary gap-tube 8 is provided around the rotor 1 of the pump and the annular magnet 2 of the DC motor. The pump rotor 1 and the permanent magnet 2 are sealed from the outside atmosphere by the gap-tube 8. A field winding 9 of the DC motor is positioned around the gap-tube 8.

Figure 3:
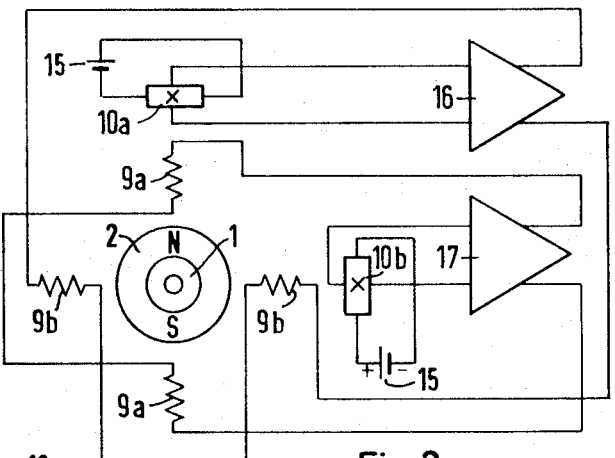
FIG. 3 is a circuit diagram of the electrical connections of the gap-tube motor pump of the present invention.
Figure 4:
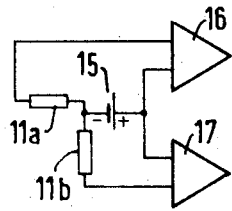
FIG. 4 is a circuit diagram of a modification of part of the circuit of FIG. 3.

The DC motor is a brushless motor and includes semiconductor components 10 such as, for example, galvanomagnetic field plates or Hall generators. The semiconductor components 10 function as angular position sensors to sense the angular position of the magnetic field of the rotor by sensing the angular position of the magnetic field of the permanent magnet 2. The sensors 10 are connected, as shown in FIGS. 3 and 4, to control an electronic commutating circuit for the field winding 9. The field winding 9 may comprise one or a plurality of field windings.

The liquid or medium to be pumped is drawn into an inlet or ingress duct 72a and is pumped out at outlet or egress duct 72b, as indicated by the arrows. An iron yoke 13, comprising stacks of laminations, is positioned around the field winding 9 of the DC motor and functions as the yoke for the magnetic field.

The pump housing, the gap-tube 8 and the impeller 3 may comprise any suitable material, dependent upon the medium or liquid to be pumped. The material may thus comprise lye or acid-resistant material such as, for example, synthetic polymethyl methacryolate, polyethylene, or corrosion-resistant or rustproof metal or metal alloys.

The permanent magnet 2 may comprise any suitable corrosion-resistant metal such as, for example, barium ferrite or an alkali nickel-cobalt alloy. This eliminates the need for special corrosion protection of the magnet 2. The magnet 2 may have two or a plurality of poles, although a two-pole magnet is highly preferable. This is due to the fact that two-pole magnets are easy to produce and may comprise material with a preferred magnetic direction.

Due to their small size and the fact that they are driven by DC, gap-tube motor pumps of the type of the present invention are particularly suitable for use in motor vehicles. The gap-tube motor pump of the present invention is considerably easier to construct than known DC motor-driven pumps. Since the pump rotor also functions as the motor rotor, the pump of the present invention eliminates the motor rotor required in a pump utilizing magnetic coupling, the two motor bearings required for journaling of the motor rotor and the external magnetic coupling.

The gap-tube motor pump of the present invention is highly suitable for pumping liquids sensitive to overheating. No short circuit currents are induced in the rotor, since the control signal provided by the semiconductor components 10 during blockage of the rotor no longer changes, thereby stopping the commutation in the windings. The number of revolutions of the motor of the present invention is readily adjustable and controllable, as in conventional DC motors.

The bearings of the pump of the present invention are lubricated by the medium to be pumped, so that said pump functions efficiently for long periods of time, without maintenance. There are no separate lubricants to contaminate the medium or liquid to be pumped, so that the possibility of a disturbed electrochemical reaction in the electrochemical cells is eliminated. Since the permanent magnet 2 may comprise corrosion-resistant material, there is no requirement for protecting said magnet against corrosion.

The pump of the present invention is especially suitable for pumping liquids which must be retained within the housing of the pump. Such liquids are obnoxious or undesirable, such as, for example, radioactive, toxic, infected, contaminated, or the like liquids, or liquids which react violently with the atmosphere. The pump is especially suited for use as a fuel pump in motor vehicles such as, for example, automobiles, surface and subsurface sea-going vessels and aircraft of any type.

In FIG. 3, two field windings 9a and 9b of the motor are positioned in the same relation to the rotor 1 of the pump as in FIG. 1. A first sensor such as, for example, a Hall device 10a, is connected to a source of DC voltage 15 via its current biasing electrodes, as is a second sensor 10b, which may comprise, for example, a Hall device.

The Hall voltage electrodes of the Hall device 10a are connected to the inputs of an amplifier 16. One output of the amplifier 16 is connected to one end of the field winding 9b and the other output of said amplifier is connected to the other end of said field winding. The Hall voltage electrodes of the Hall device 10b are connected to the inputs of amplifier 17. One output of the amplifier 17 is connected to one end of the field winding 9a and the other output of said amplifier is connected to the other end of said field winding.

In the modification of FIG. 4, the Hall device 10a is replaced by the first field plate 11a and the second Hall device 10b is replaced by second field plate 11b. Otherwise, the circuits of FIGS. 3 and 4 are identical.

The circuit of FIG. 3 functions in the manner described in U.S. Pat. No. 3,517,289, issued on Jun. 23, 1970, and assigned to the assignee of the present invention, wherein the current in the windings is controlled in dependence upon the position of the permanent magnet rotor, with the aid of electronic control components such as transistors and in such a manner that a torque is constantly imparted to the rotor in one direction and the control of the transistors is effected by Hall devices which are subjected to the magnetic field of the rotor.

While the invention has been described by means of specific examples and in specific embodiments, I do not wish to be limited thereto, for obvious modifications will occur to those skilled in the art without departing from the spirit and scope of the invention.

I claim:

1. A pump for chemically aggressive liquids, comprising:
   a pump housing having a tubular portion of nonmagnetic material;
   a pump rotor coaxially journaled in said housing and having bearings enclosed within said housing so that said rotor and said bearings are exposed to liquid being pumped;
   a brushless DC motor having permanent magnet means coaxially joined with said pump rotor within said tubular housing portion and having field windings mounted externally on said tubular portion for action upon said permanent magnet means; and
   sensors responsive to angular position of said permanent magnet means for controlling the commutation of said field windings, said sensors comprising galvanomagnetic semiconductor components mounted on said pump housing externally of said tubular portion.

2. A pump as claimed in claim 1 for delivering liquids in hermetically sealed systems, said pump housing having an inlet duct and an outlet duct for ingress and egress respectively of the liquid and being otherwise completely sealed so as to hermetically envelop said pump rotor with said magnet and said bearings.

3. A pump as claimed in claim 1, said angular position sensors consisting of galvanomagnetic two-terminal resistors.

4. A pump as claimed in claim 1, said angular position sensors consisting of Hall generators.

5. A fuel pump for vehicles comprising:
a pump housing having a tubular portion of nonmagnetic material;
a vane-carrying pump rotor coaxially journaled in said housing and having bearings enclosed within said housing so that said rotor and said bearings are exposed to liquid being pumped;
a brushless DC motor having permanent magnet means coaxially joined with said pump rotor within said tubular housing portion and having field windings mounted externally on said tubular portion for action upon said permanent magnet means, said housing having an inlet duct and an outlet duct for ingress and egress respectively of the liquid and being otherwise sealed so as to hermetically envelop said pump rotor with said magnet and said bearings; and
galvanomagnetic sensors responsive to angular position of said permanent magnet means for controlling the commutation of said field windings, said sensors being mounted on said pump housing externally of said tubular portion.